Oct. 17, 1967  J. WINS  3,347,654
GLASS TANK FURNACE WALL STRUCTURE
Filed Nov. 10, 1966  2 Sheets-Sheet 1
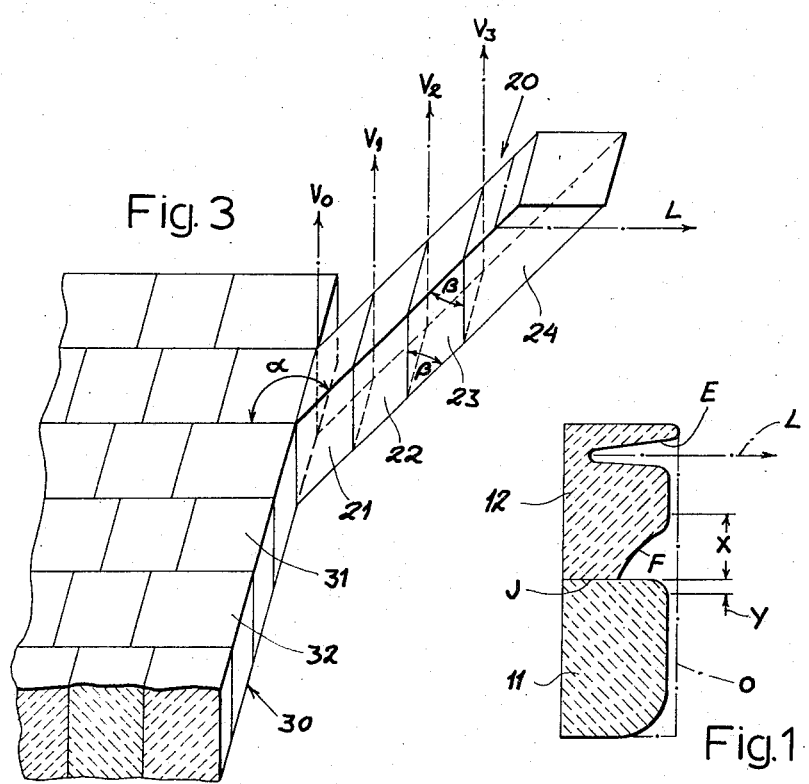
Jean Wins
INVENTOR.
BY Karl F. Ross
Attorney Oct. 17, 1967   J. WINS   3,347,654
GLASS TANK FURNACE WALL STRUCTURE
Filed Nov. 10, 1966   2 Sheets-Sheet 2

Jean Wins
INVENTOR.

BY Karl F. Ross
Attorney

United States Patent Office 3,347,654
Patented Oct. 17, 1967

3,347,654
GLASS TANK FURNACE WALL STRUCTURE
Jean Wins, Marcinelle, Belgium, assignor to G.B.D. Societe Anonyme Holding, Luxembourg, a corporation of Luxembourg
Filed Nov. 10, 1966, Ser. No. 593,373
Claims priority, application France, Nov. 5, 1962, 914,332
7 Claims. (Cl. 65—347)

ABSTRACT OF THE DISCLOSURE

Vessel for a tank furnace, designed to contain molten glass, whose side walls are upwardly and outwardly inclined and are composed of tiles separated by substantially vertical contact surfaces to minimize the erosion of the joints by the melt.

---

This application is a continuation-in-part of my copending application Ser. No. 320,907 filed Nov. 1, 1963, now abandoned.

My present invention relates to a tank furnace as used in glass manufacture.

The vessels containing the molten glass in such furnaces are generally composed of tiles of refractory material in the shape of orthogonal prisms which are arranged in several superposed tiers to form the walls of the vessel. The tiers, adjoining one another along horizontal planes, have contact surfaces subject to the corrosive influence of the glass melt. This corrosion, which not only erodes the walls but also contaminates the melt with tile and binder material, has been found to occur predominantly along the horizontal joints between the tiers and only to a considerably reduced extent at the vertical contact surfaces between the tiles of each individual tier. It has also been established that the erosion tends to progress upwardly from the horizontal joints and attacks the tiles above the joint much more strongly than those below.

The general object of my invention is to provide an improved vessel for the storage of molten glass in tank furnaces which is substantially free from the aforedescribed drawbacks.

This object is realized, in accordance with my invention, by the provision of outwardly inclined walls on such vessel whose constituent tiles contact one another only along substantially vertical joints.

More specifically, the tiles forming the inclined walls are arranged in tiers adjoining one another along substantially vertical planes; at least the tiles of those tiers which extend below the level of the melt are of generally parallelogrammatic vertical cross-section, in a plane transverse to the wall, with acute angles at their diagonally opposite top and bottom corners. The obtuse angle included between the walls and the bottom plate of the vessel, which in the conventional manner may be composed of orthogonal prismatic tiles, may range between slightly more than 90° and approximately 160°, the aforementioned acute angles of the parallelogram correspondingly ranging from near zero to not more than about 70°.

The invention will be described in greater detail with reference to the accompanying drawing in which:

FIG. 1 is a cross-sectional view of two tiers of a conventional furnace wall, illustrating the observed corrosion pattern;

FIG. 2 shows, in cross-sectional elevation, an improved vessel for tank furnaces embodying my invention;

FIG. 3 is a fragmentary perspective view of the vessel of FIG. 2, illustrating in partly diagrammatic form the arrangement of the tiles in the bottom plate and one of the side walls thereof.

Figure 4:
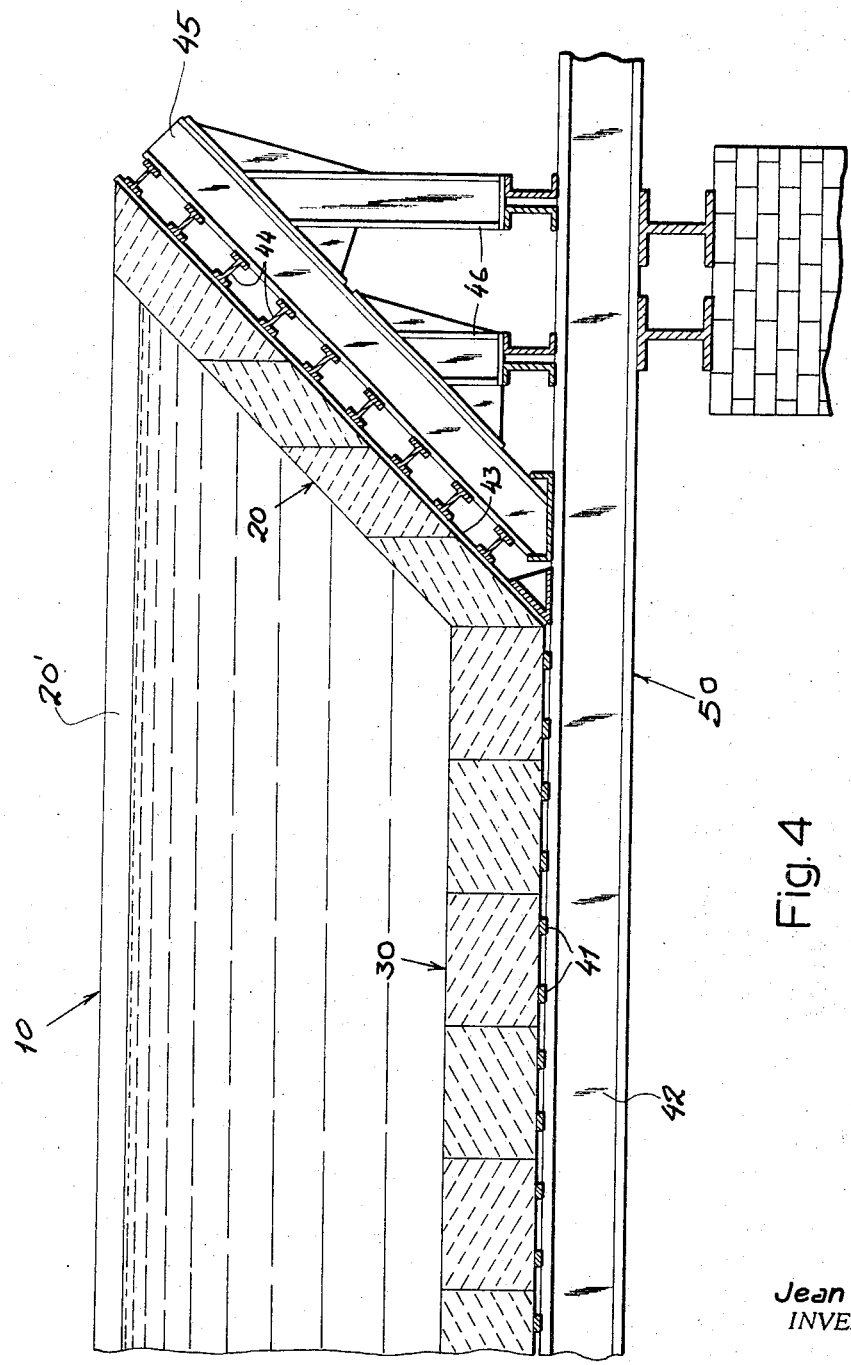
FIG. 4 is a fragmentary view generally similar to FIG. 2 but drawn to a larger scale and showing the vessel together with a supporting shell structure.

In FIG. 1 I have shown two superposed ceramic tiles 11 and 12 bonded together, in the usual manner, along a horizontal joint J defining the boundary between a lower and an upper tier. The original rectangular outline of the tiles 11 and 12, on the side facing the glass melt whose level L lies above the joint J, has been indicated at O. The joint J forms the starting point for the corrosive action of the melt which is pictured as having eroded a substantial portion of the upper tile 12, over a vertical distance X, whereas the top surface of the lower tile 11 has been eaten away only to a relatively small depth y. The face F of the recess formed in the tile 12 by this corrosion process is highly pitted and exhibits fairly deep upwardly directed crevices which further weaken the structure.

FIGS. 2 and 3 illustrate an improved vessel 10 embodying my invention, having side walls 20, end walls 20' (only one shown) and a bottom plate 30. The side and end walls are outwardly inclined and include with the bottom plate 30 an obtuse angle $\alpha$ of not more than substantially 160°, here specifically 135°. As more clearly seen in FIG. 3, in which only one column of tiles 21, 22, 23, 24 of one of the walls 20 has been illustrated, these tiles adjoin one another along their vertical planes $V_1$, $V_2$ and $V_3$. Bottom plate 30, consisting of orthogonally prismatic tiles 31, 32 of square and rectangular outline, adjoins the lowermost tile 21 along another vertical plane $V_0$. It will be noted that the tiles 21, 22 and 23, forming part of the three lowermost tiers which lie below the level L of the glass melt, are of parallelogrammatic outline and cross-section in transverse vertical planes, the diagonally opposite top and bottom corners of the parallelogram having acute angles $\beta$, equal to $\alpha-90°$, here shown to equal 45°. The tile 24 of the uppermost tier, which projects above the level L, is of trapezoidal outline since its horizontal upper surface is not subjected to the corrosive action of the melt.

It will thus be seen that all the tiles of the vessel 10, including those of its bottom plate 30 as well as those of its outwardly inclined walls 20 and 20', adjoin one another only along vertical surfaces.

An additional advantage of the inclined positioning of the walls 20, 20' is that, at the location of the melt level L, the horizontal thickness of the walls is appreciably increased so that the walls will better resist the intense erosive action at this level (indicated at E in FIG. 1). Furthermore, this outward inclination facilitates the stable disposition of slabs 40 which may be provided, as a conventional protective lining (e.g. of high-melting metal), to overlie the joints of the walls of the vessel.

The tiles of the vessel 10 may be held in their illustrated relative position by various means known per se such as, for example, adhesive bonding; they can also be supported, with or without bond, on the inner walls of a surrounding shell structure, e.g. as illustrated in FIG. 4. This shell structure, generally designated 50, comprises an array of juxtaposed horizontal metal bars 41, resting on a set of beams 42 (only one shown), and upwardly inclined bars 43 which are supported, through the intermediary of transverse profiles 44, on sloping beams 45 which are braced by uprights 46 against the beams 42. Thus, bars 41 support the orthogonal tiles of bottom plate 30 while the bars 43 bear the parallelogrammatic tiles of sidewalls 20, 20'. If the tiles are left uncemented, they will be retained in position solely by their own weight and by the geometry of the structure.

A wall constructed as herein disclosed is suitable not only for the refining chamber of a tank furnace but also for other vessels thereof contacted by the molten glass such as, for example, a draw pot and its supply channel leading to the refining chamber.

What is claimed is:

1. In a tank furnace a vessel for molten glass, said vessel comprising a floor of refractory material, means forming flat, continuous supporting surfaces rising inclinedly outwardly from said floor on opposite sides thereof, and walls composed of refractory tiles with beveled lower faces alignedly resting on said supporting surfaces and together defining a flat, continuous outer surface for each of said walls, said tiles adjoining one another along vertical contact surfaces from the level of said floor to the top of each wall.

2. A vessel as defined in claim 1 wherein said floor comprises a bottom plate also composed of tiles adjoining one another along substantially vertical contact surfaces.

3. A vessel as defined in claim 2 wherein said bottom plate is composed of orthogonally prismatic tiles.

4. A vessel as defined in claim 1, further comprising a protective lining of flat slabs overlying the joints on the confronting inner surfaces of said walls.

5. A vessel as defined in claim 1 wherein said tiles also have beveled coplanar upper faces defining flat, continuous inner surfaces for said walls.

6. A vessel as defined in claim 5 wherein the angles included between said beveled faces and the vertical are at most equal to substantially 70°.

7. A vessel as defined in claim 1 wherein the outer surface of each of said walls includes with said floor an obtuse angle up to substantially 160°.

References Cited

UNITED STATES PATENTS 2,078,795  4/1937  Forter _____ 65—347

FOREIGN PATENTS 548,575  10/1942  Great Britain.

DONALL H. SYLVESTER, *Primary Examiner.*

S. LEON BASHORE, *Examiner.*

A. D. KELLOGG, *Assistant Examiner.*